United States Patent
McLeod et al.

(10) Patent No.: US 10,438,425 B2
(45) Date of Patent: Oct. 8, 2019

(54) TOUCH PAD CIRCUIT BOARD HAVING RADIO FREQUENCY ANTENNA AND CAPACITIVE TOUCH PAD AND ACCESS CONTROL READER DEVICE USING THE RADIO FREQUENCY ANTENNA IN PROXIMITY TO THE CAPACITIVE TOUCH PAD

(71) Applicant: Sensormatic Electronics, LLC, Boca Raton, FL (US)

(72) Inventors: Murdo Jamie Scott McLeod, Belfast (GB); Timothy John Harrison, Lisburn (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 61 days.

(21) Appl. No.: 15/205,911

(22) Filed: Jul. 8, 2016

(65) Prior Publication Data
US 2018/0012430 A1    Jan. 11, 2018

(51) Int. Cl.
| | |
|---|---|
| G07C 9/00 | (2006.01) |
| G06F 3/044 | (2006.01) |
| G06F 3/041 | (2006.01) |
| G06K 7/10 | (2006.01) |
| G06F 3/0354 | (2013.01) |

(52) U.S. Cl.
CPC ..... *G07C 9/00039* (2013.01); *G06F 3/03547* (2013.01); *G06F 3/044* (2013.01); *G06F 3/0416* (2013.01); *G06K 7/10009* (2013.01); *G07C 9/00174* (2013.01); *G07C 9/0069* (2013.01)

(58) Field of Classification Search
None
See application file for complete search history.

(56) References Cited

U.S. PATENT DOCUMENTS

| | | | |
|---|---|---|---|
| 8,985,466 B2 * | 3/2015 | Wu | G06K 19/07773 235/462.46 |
| 2011/0157079 A1 * | 6/2011 | Wu | G06F 3/044 345/174 |
| 2013/0229273 A1 * | 9/2013 | Nodar Cortizo | G06F 1/3203 340/407.2 |
| 2014/0176447 A1 * | 6/2014 | Alameh | G06F 3/044 345/173 |
| 2015/0002446 A1 * | 1/2015 | Ayzenberg | G06F 3/044 345/174 |
| 2015/0193080 A1 * | 7/2015 | Takahashi | G06F 3/044 345/174 |

* cited by examiner

Primary Examiner — Daniell L Negron
(74) Attorney, Agent, or Firm — HoustonHogle LLP

(57) ABSTRACT

An access control reader device integrates a touch pad in proximity to a radio frequency identification (RFID) antenna. A touch pad circuit board includes the RF antenna having a physical aperture and the capacitive touch pad positioned at least partially within the physical aperture of the RF antenna. This configuration allows the RFID reader to detect RFID tags in proximity to the capacitive touch pad. In order to prevent interference, such as the formation of eddy currents, the sensors of the touch pad are in the form of interrupted loops.

16 Claims, 6 Drawing Sheets

TOUCH PAD CIRCUIT BOARD HAVING RADIO FREQUENCY ANTENNA AND CAPACITIVE TOUCH PAD AND ACCESS CONTROL READER DEVICE USING THE RADIO FREQUENCY ANTENNA IN PROXIMITY TO THE CAPACITIVE TOUCH PAD

BACKGROUND OF THE INVENTION

Access control systems are often installed within and around commercial, residential, or governmental buildings, for instance. Examples of these buildings include hospitals, warehouses, schools or universities, hotels, shopping malls, office buildings, and casinos. The access control systems are principally concerned with physical security and the selective restriction of or notification of access to a place or other resource. The access control systems typically include components such as access controllers, door lock controllers, and access control reader devices.

The access control reader devices work with access controllers to determine whether users are authorized to enter restricted areas. The access control reader devices are often installed throughout the buildings to control access to the restricted areas. Typically, users interact with the access control reader devices by swiping cards or bringing contactless keycards within range (approximately 2-3 inches or 5 centimeters) of the access control reader devices. The access control reader devices read identification information of the cards and then the access controllers determine if the users are authorized to enter the restricted areas. If the users are authorized to enter the restricted areas, then the access controllers might signal door lock controllers to unlock locked doors or open gates or signal elevator controllers to open the elevator doors or move to a new floor, for example.

Radio frequency identification (RFID) technology is commonly used in the contactless keycards. The cards have embedded RFID tags that are then read when they come into proximity with RFID readers. These RFID readers include two-way radio transmitter-receivers and use RFID antenna(s) that send signals to RFID tags and read their response. Generally, RFID tags are either passive, active, or battery-assisted passive. Active RFID tags periodically broadcast their identification signal whereas passive RFID tags are powered by RF energy transmitted from the reader. Finally, battery-assisted passive RFID tags transmit their identification signal when activated by the RFID reader.

Some access control reader devices also include numeric mechanical keypads. These keypads provide an alternative mechanism for interacting with the access control systems. In one example, after users swipe their cards or bring their contactless keycards within range, the users then enter personal identification numbers (PINs) using the numeric keypads. This provides an added level of security to handle situations in which access cards might have been lost or stolen. The access controllers then authorize users based on the entered PINs and the identification information from their cards.

For some applications, touch pads have replaced numeric mechanical keypads. The touch pads detect the users' touch often using a grid of monolithically-fabricated touch sensors. There are a number of touch sensor technologies, but the two most common are capacitive and resistive detection.

There are some advantages to replacing numeric keypads with touch pads. One advantage is that some touch pads require fewer parts than numeric keypads. Another advantage to replacing keypads with touch pads can be lowered manufacturing costs, reduced mechanical wear, and increased longevity.

Capacitive and resistive touch pads share a number of common components. They both have conductive touch sensors mounted or formed on a circuit board. A device controller then monitors those touch sensors to detect changes in capacitance or resistance as an indication of a user touching or coming into proximity with a particular sensor or the touch pad as a whole.

SUMMARY OF THE INVENTION

In order to provide an ergonomically efficient and compact access control reader device, it would be desirable to integrate a touch pad in close proximity to the RFID antenna. This would allow users to enter a PIN for example and wave their contactless keycard in the same place and on the same device. In contrast, many current systems have a keypad in one location and a reader unit in another location.

Especially for passive and battery-assisted passive RFID tags, the RFID readers generate high powered RF fields. These fields are required to activate and/or power the RFID tags. In fact, these RF fields can be many orders of magnitude stronger than the response signals generated by the RFID tags.

The various components of the access control reader devices need to be designed to be robust against inference from the RFID readers. For example, locating the RFID antenna in close proximity to the capacitive touch pad can induce the formation of eddy currents (i.e., electrical currents induced by RF fields) in the capacitive touch pad, particularly with passive and battery-assisted passive RFID tag technology. Specifically, the RF fields near the capacitive touch sensors of the capacitive touch pad can induce formation of eddy currents that can potentially disrupt the functionality of the device controller in using the capacitive touch sensors to sense differences in capacitance. The access control reader devices need to be designed to limit formation of these eddy currents in the capacitive touch pad.

Embodiments of the present invention feature an access control reader device that incorporates the RFID antenna in close proximity to the capacitive touch pad. For example, the access control reader device can include the capacitive touch pad positioned at least partially within a physical aperture of the RFID antenna. The physical aperture is defined as an area or an opening circumscribed by the RFID antenna. The capacitive touch pad might include one or more capacitive touch sensors and a touch guard ring. Each capacitive touch sensor can include at least one capacitive touch sensor element in the form of an interrupted loop for limiting formation of eddy currents. The touch guard ring can also be in the form of an interrupted loop for limiting formation of eddy currents.

In general, according to one aspect, the invention features a touch pad circuit board including a radio frequency (RF) antenna having a physical aperture and a capacitive touch pad positioned at least partially within the physical aperture of the RF antenna. In one example, this touch pad circuit board is for use in an access control reader device. As appreciated by one of skill in the art, this touch pad circuit board can be used in other devices where it is relevant and/or beneficial to use the RF antenna in close proximity to the capacitive touch pad.

In an embodiment, the capacitive touch pad (also known as a capacitive touch array) has one or more capacitive touch sensors positioned within the physical aperture with the RF antenna extending around the capacitive touch sensors. The one or more capacitive touch sensors each include two capacitive touch sensor elements, typically an inner capacitive touch sensor element and an outer capacitive touch sensor element. At least one of the capacitive touch sensor elements is preferably in the form of an interrupted loop. For example, the outer capacitive touch sensor element is preferably in the form of the interrupted loop. Other forms or styles of capacitive touch sensor elements may be used as appreciated by one of skill in the art.

The capacitive touch pad can also include a capacitive touch guard ring for providing proximity sense detection. The capacitive touch guard ring extends around a periphery of the physical aperture. The capacitive touch guard ring is preferably in the form of an interrupted loop.

The RF antenna can include one or more series-connected current-carrying loops.

In general, according to another aspect, the invention features an access control reader device having a capacitive touch pad for receiving input from users, a radio frequency identification (RFID) reader for reading RFID tags of the users, and a RFID antenna of the reader. The RFID antenna detects RFID tags in proximity to the capacitive touch pad. The RFID antenna can detect RFID tags in a volumetric region in front of the capacitive touch pad. The RFID antenna is characterized by a physical aperture. The capacitive touch pad is preferably positioned at least partially within the physical aperture of the RFID antenna when viewed along an axis that is normal to a plane of the capacitive touch pad.

In an embodiment, the access control reader device further includes another RFID antenna for detecting RFID tags in proximity to the capacitive touch pad.

In general, according to another aspect, the invention features a method of operating an access control reader device. The method includes a capacitive touch pad receiving input from users. The method also includes an RFID antenna detecting RFID tags of the users in a volumetric region above the capacitive touch pad.

The method can include an RFID reader reading identification information from the RFID tags of the users. An access controller authenticates the identification information. Then, a door lock controller unlocks a door after the access controller authenticates the identification information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
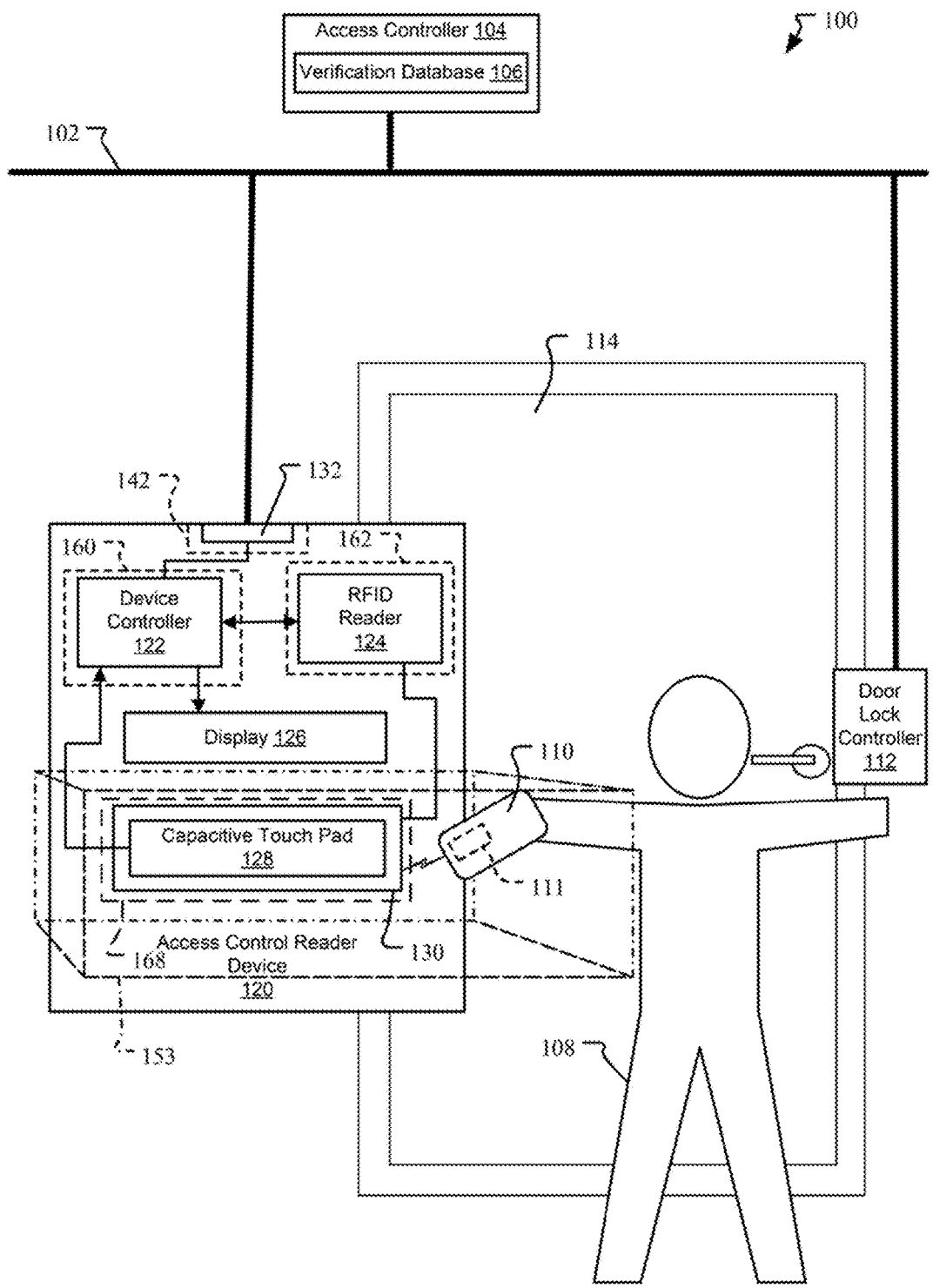
FIG. 1 is a schematic diagram of an access control system including an access controller, a door lock controller, and an access control reader device.

FIG. 1 depicts an access control system 100 including an access controller 104, an access control reader device 120, and a door lock controller 112 connected to each other via a system network 102.

The access controller 104 typically monitors several access control reader devices 120 on the system network 102 for receipt of authentication information. The authentication information can be in the form of identification information (e.g., radio frequency identification (RFID) tag identifier codes), PINs, barcodes, security credentials, etc. As appreciated by one of skill in the art, the authentication information may be in other forms related to the identity of the user 108 and/or identify of devices on the user 108.

Typically, the access controller 104 receives the authentication information from the access control reader devices 120 via the system network 102. The access controller 104 uses a verification database 106 for determining whether users 108 are authorized to enter restricted areas. The verification database 106 includes a list of authorized users that correlate with the authentication information. The access controller 104 determines whether users 108 are authorized by comparing authentication information received from the users 108 (via the access control reader devices 120) against the verification database 106.

After determining that one of the users 108 is authorized, the access controller 104 signals the door lock controller 112 to unlock a door 114 to a restricted area, for example. The door lock controller 112 is connected to a lock of the door 114. After receiving signals from the access controller 104 via the system network 102, the door lock controller 112 unlocks the door 114 by signaling the lock. In other examples, the door lock controller 112 is a different type of controller for unlocking or opening garage doors, turnstiles, elevator doors, gates, or the like and thereby provide or restrict access through an access point.

The access control reader devices 120 are installed near various access points to restricted areas. These access points can include doorways, hallways, elevators, parking garages, and the like as appreciated by one of skill in the art. Multiple access control reader deices 120 are typically installed inside and outside a building at these different access points.

FIG. 1 schematically depicts some of the internal components of the access control reader device 120. These internal components include an RFID reader 124, an RFID antenna 130, a capacitive touch pad 128, a device controller 122, and a display 126.

The RFID reader 124 is installed on a main printed circuit (PC) board 162. For example, the RFID reader 124 is preferably mounted to the main PC board 162. The RFID reader 124 is connected to the RFID antenna 130 via the main PC board 162.

The RFID antenna 130 is characterized by a physical aperture within a touch pad PC board 168. The physical aperture is defined as an area or an opening circumscribed by the RFID antenna 130 in the touch pad PC board 168. The RFID reader 124 can use the RFID antenna 130 to collect RF signals within the physical aperture.

The RFID antenna 130 is preferably a high frequency (HF) RFID antenna. The RFID reader 124 can use the HF RFID antenna 130 to generate RF energy ranging from about 3 MHz to about 30 MHz. The RFID reader 124 preferably operates the HF RFID antenna 130 at about 13.56 MHz. The RFID reader 124 can use the HF RFID antenna 130 to detect RF signals at a range between about 10 cm and about 1 m.

The capacitive touch pad 128 is positioned at least partially within the physical aperture of the RFID antenna 130. For example, as illustrated, the capacitive touch pad 128 is positioned entirely within the physical aperture of the RFID antenna 130 when viewed along an axis that is normal to a plane of the capacitive touch pad 128. The capacitive touch pad 128 is positioned in the physical aperture such that the RFID antenna 130 extends around the capacitive touch pad 128 in the touch pad PC board 168. The capacitive touch pad 128 can be fabricated into a planar surface of the touch pad PC board 168.

The capacitive touch pad 128 receives input from the user 108. For example, the user 108 can use the capacitive touch pad 128 to enter their authentication information (e.g., personal identification number (PIN)). As appreciated by one of skill in the art, the user 108 can use the capacitive touch pad 128 to input other types of authentication information related to the identity of the user 108.

The user 108 uses a contactless keycard 110 to interact with the RFID reader 124. The contactless keycard 110 includes an RFID tag 111 embedded within the contactless keycard 110. The RFID tag 111 is programmed with identification information (e.g., RFID tag identifier code) that uniquely identifies itself. The RFID tag 111 is preferably passive or battery-assisted passive. Passive RFID tags are powered by RF energy transmitted by the MD reader 124 whereas battery-assisted passive RFID tags are powered from batteries and activated by the transmitted RF energy. After being powered or activated, the RFID tag 111 (passive or battery-assisted passive) broadcasts its identification information in the form RF signals. The contactless keycard 110 can also include a name and a picture of the user 108. The name and picture are typically printed to one side of the contactless keycard 110 for identification purposes.

The RFID reader 124 uses the RFID antenna 130 to detect the RFID tag 111 of the contactless keycard 110 and then reads identification information from the RFID tag 111. The RFID reader 124 uses the RFID antenna 130 to emit RF energy for powering or activating the RFID tag 111. When activated or powered, the RFID tag 111 broadcasts its identification information in the form of RF signals. The RFID reader 124 uses the RFID antenna 130 to detect the RF signals of the RFID tag 111. Then, the RFID reader 124 reads the identification information from the RF signals received at the RFID antenna 130.

The RFID reader 124 detects the RFID tag 111 of the contactless key card 110 in a volumetric region 153. The volumetric region 153 is in front of and in proximity to the capacitive touch pad 128. The size of the volumetric region 153 is limited to the range of detection specified by the type of RFID antenna 130 (e.g., typical range for HF RFID antenna is between about 10 cm and about 1 m). The volumetric region 153 extends from the planar surface of the touch pad PC board 168 to form, for example, a rectangular volumetric region. As appreciated by one of skill in the art, the shape of this volumetric region 153 can vary based on the shape and type of RFID antenna 130.

The device controller 122 monitors and/or directs the RFID reader 124 and the capacitive touch pad 128. The device controller 122 can direct the RFID reader 124 to read identification information and then monitor the RFID reader 124 for the read identification information. The device controller 122 monitors the capacitive touch pad 128 for receipt of entered PINs. The device controller 122 is preferably mounted to a module control processor (MCP) board 160. The RFID reader 124 and the capacitive touch pad 128 are connected to the MCP board 160. The device controller 122 receives identification information from the RFID reader 124 and entered PINs from the capacitive touch pad 128 via the MCP board 160.

The device controller 122 directs the display 126 to present information to the user 108. The display 126 can include a liquid crystal display (LCD) module for presenting information to the user 108. The device controller 122 directs the display 126 to present various types of information to the user 108. For example, the device controller 122 can direct the display 126 to present the PIN entered by the user 108 in real time. In another example, the device controller 122 can direct the display 126 to present information indicating the successful authorization of the user 108 to enter restricted areas.

The device controller 122 directs the network interface 132 to send/receive communications via the system network 102. The device controller 122 can direct the network interface 132 to transmit communications (e.g., identification information and PINs) to the access controller 104 via the system network 102. The device controller 122 also monitors the network interface 132 for communications (e.g., information regarding authorization of the user 108) from the access controller 104. The network interface 132 is preferably installed on an input/output (I/O) board 142. The network interface 132 is in communication with the device controller 122 via the I/O board 142.

In summary, the access controller 104 works with the access control reader device 120 in determining whether the user 108 is authorized to enter the restricted area. The user 108 brings their contactless keycard 110 within the volumetric region 153. The access control reader device 120 uses the RFID reader 124 to read identification information from the contactless keycard 110. The user 108 might then enter their PIN or other information using the capacitive touch pad 128 of the access control reader device 120. The access control reader device 120 forwards the identification information and the PIN of the user 108 to the access controller 104 via the system network 102. The access controller 104 determines whether or not the user 108 is authorized to enter the restricted area by authenticating the received PIN and identification information. The access controller 104 authenticates by comparing the identification information and PIN against the verification database 106.

Figure 2:
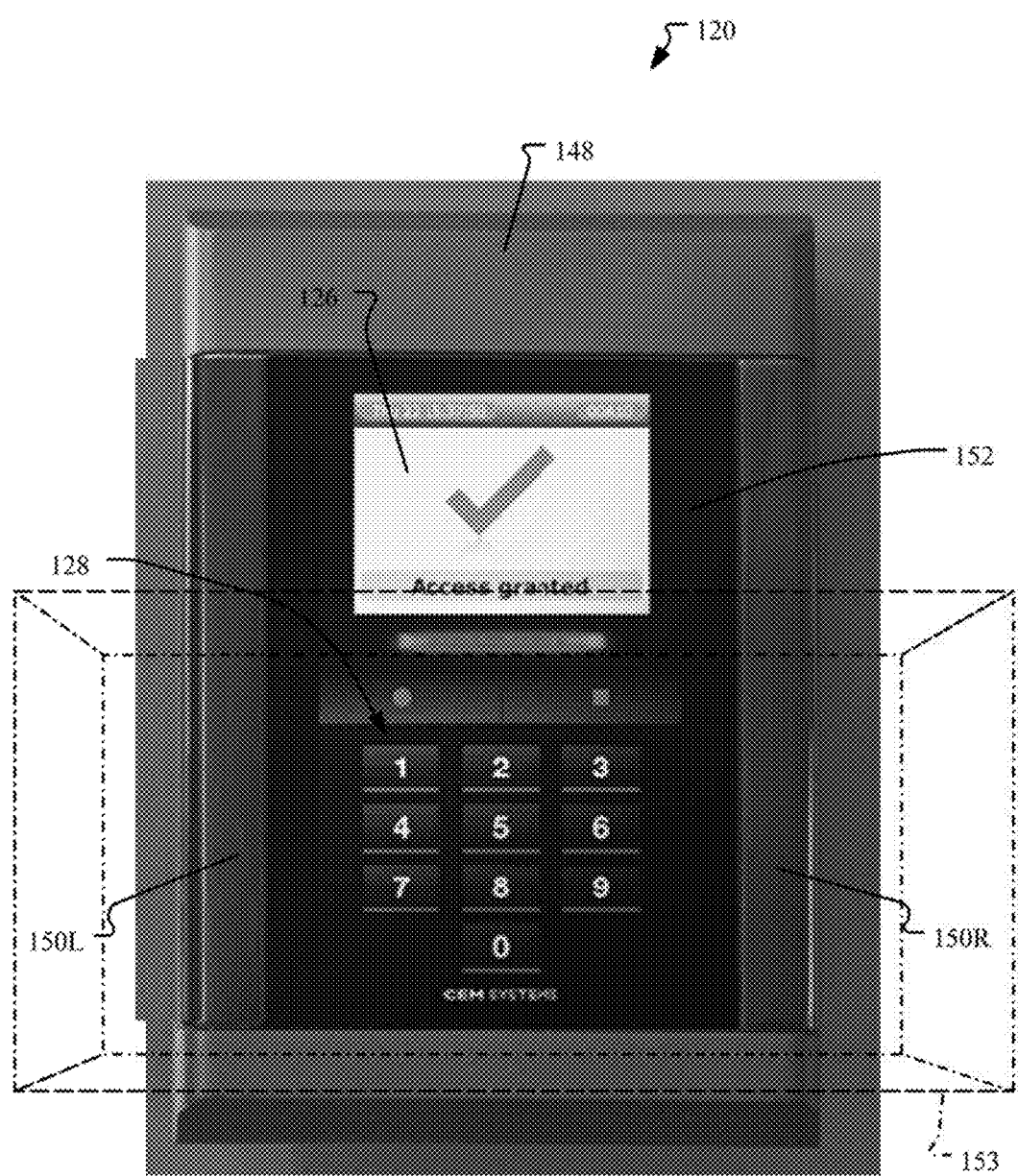
FIG. 2 is a front view of an embodiment of the access control reader device of FIG. 1.

FIG. 2 is a front view of an example access control reader device 120 as viewed by the user 108 when interacting with the access control reader device 120. As described above, the user 108 can interact with the access control reader device 120 by using the capacitive touch pad 128 to enter authentication information (e.g., PIN). The user 108 can also interact with the access control reader device 120 by waiving their contactless keycard 110 within the volumetric region 153. As described above, the access control reader device 120 can read identification information from the contactless keycard 110. Further, the user 108 can interact with the access control reader device 120 by viewing information presented on the display 126. For example, the user 108 can view information indicating authorization of the user 108 (e.g., "Access granted") on the display. The access control reader device 120 includes a front cover 148, side trims 150L-R, and a front window 152 for protecting the internal components of the access control reader device 120 from being damaged during user interaction.

Figure 3:
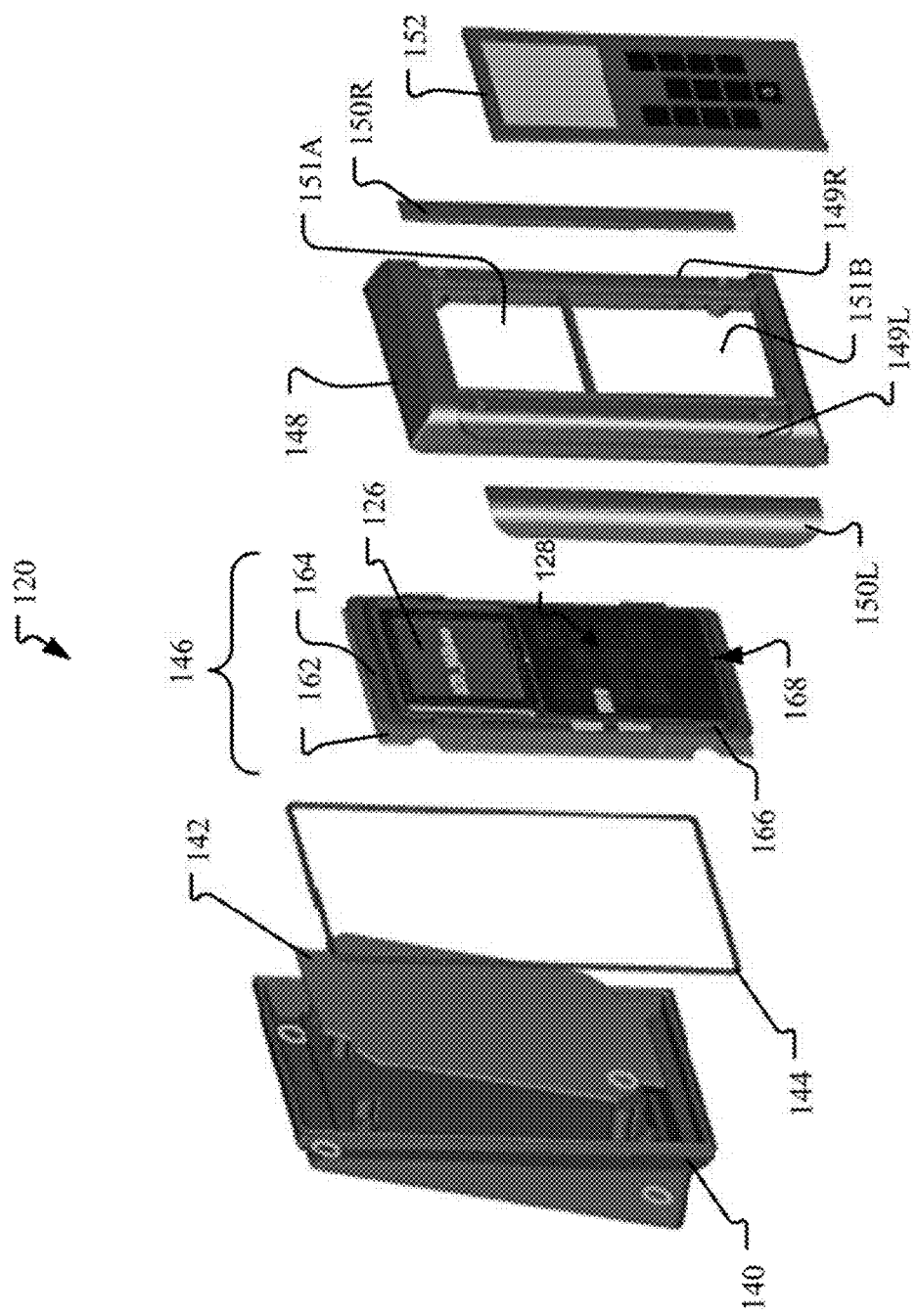
FIG. 3 is an exploded view of the access control reader device of FIG. 2 including a frame assembly.

FIG. 3 is an exploded view of the main components of the access control reader device 120 of FIG. 2. The main components include a base 140, the I/O board 142, an o-ring 144, a frame assembly 146, the front cover 148, the side trims 150L, 150R, and the front window 152.

The I/O board 142 and the frame assembly 146 are installed in the base 140. For example, the I/O board 142 and the frame assembly 146 can be stacked together and then installed within the base 140. The base 140 provides protection to these components from external elements such as debris, moisture, etc. The o-ring 144 is installed along an edge of the base 140 to further seal the base 140 from access by the external elements.

The front cover 148 and side trims 150L, 150R are installed in front of the frame assembly 146. The front cover 148 includes openings 151A, 151B configured to receive the display 126 and the capacitive touch pad 128 of the frame assembly 146. When the front cover 148 is installed in front of the frame assembly 146, the shapes of the display 126 and the capacitive touch pad 128 match the openings 151A, 151B, respectively. The side trims 150L, 150R are installed to the sides of the front cover 148. In particular, the left side trim 150L is installed to a left side slot 149L of the front cover 148 and the right side trim 150R is installed to a right side slot 149R of the front cover 148. The front cover 148 and the side trims 150L, 150R together enclose the front of the frame assembly 146 (including the display 126 and the touch pad PC board 168).

The front window 152 is installed in front of the openings 151A, 151B of the front cover 148. The front window 152 can be mounted within the front cover 148 such that the front window 152 is positioned to cover the openings 151A, 151B. The front window 152 protects the display 126 and the capacitive touch pad 128 from being damaged by the user 108 and/or by the external elements. The front window 152 can be made from polycarbonate 4 color pad printed material. As illustrated in FIGS. 2-3, the polycarbonate 4 color pad printed material is printed with a keypad corresponding with the capacitive touch pad 127. The printed keypad can include labels for 0 to 9, a circle, a square, and the like as appreciated by one of skill in the art.

Figure 4:
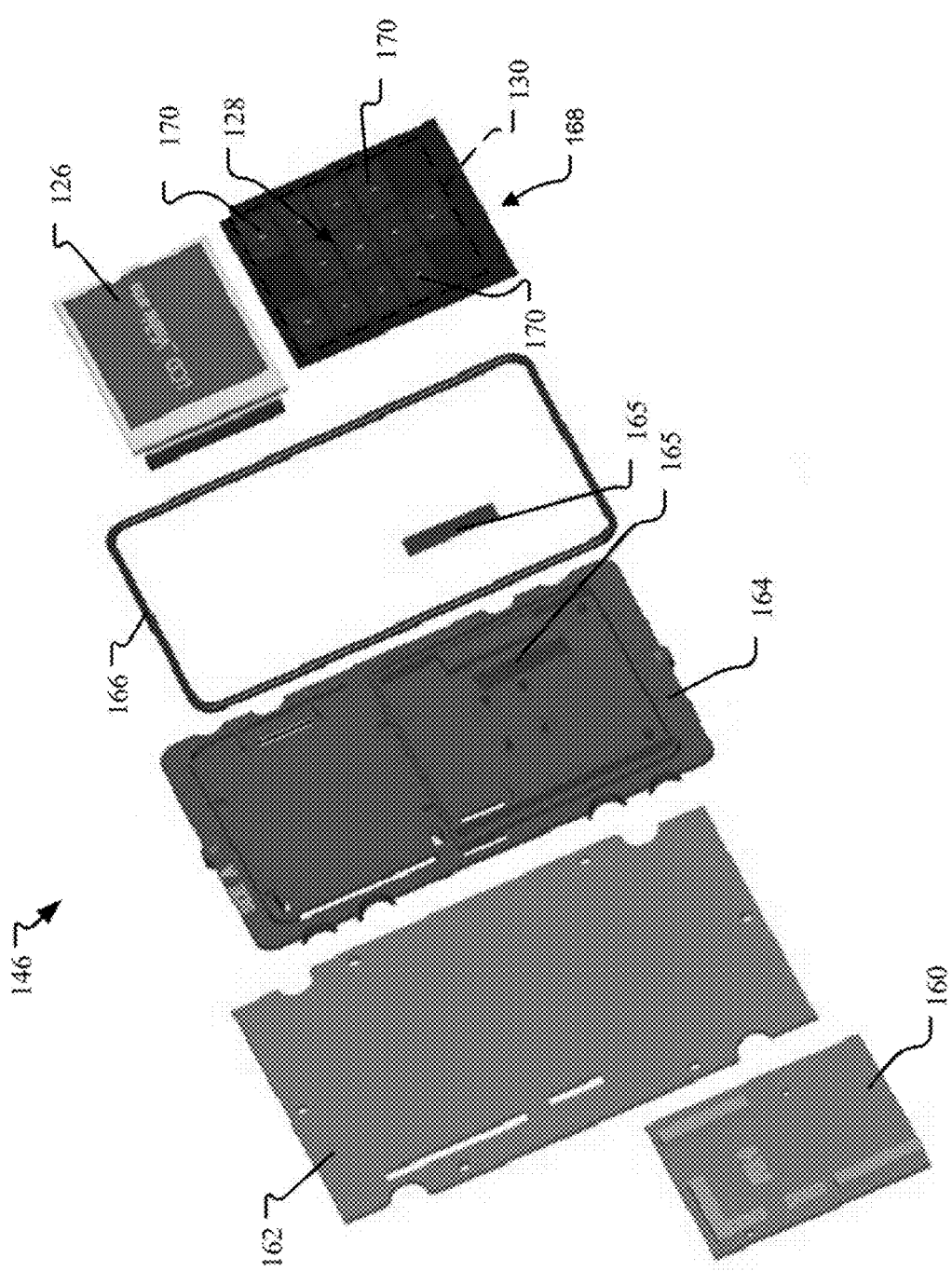
FIG. 4 is an exploded view of the frame assembly of FIG. 3 including a touch pad printed circuit (PC) board.

FIG. 4 depicts an exploded view of the main parts of the frame assembly 146 of FIG. 3. The main parts of the frame assembly 146 include the MCP board 160, the main PC board 162, a frame 164, a par of LCD pads 165, a low frequency (LF) RFID antenna 166 (optional), the display 126, and the touch pad PC board 168.

The MCP board 160 and the main PC board 162 control and monitor various components of the access control reader device 120. As described above, the MCP board 160 includes the device controller 122 for controlling and/or monitoring the network interface 132, the RFID reader 124, the capacitive touch pad 128, and the display 126. The main PC board 162 includes the RFID reader 124 that uses the RFID antenna 130 to detect contactless keycards 110. The MCP board 160 can be mounted to the main PC board 162.

The frame 164 is a chassis structure for receiving the main parts of the frame assembly 146. For example, the MCP board 160 and the main PC board 162 can be installed within a back side of the frame 164. The LCD pads 165, the LF RFID antenna 166, the display 126, and the touch pad PC board 168 can be stacked and installed within a front side of the frame 164. Preferably, the frame 64 can be made from a plastic chassis material.

The display 126 is connected to the LCD pads 165 for powering and controlling the display 126. For example, the LCD pads 165 are connected to a power source in order to provide power to the display 126. The LCD pads 165 can also be connected to the device controller 122. The device controller 122 uses the LCD pads 165 to direct the display 126 to present various information.

The access control reader device 120 optionally includes the LF RFID antenna 166 for detecting contactless keycards 110. The LF RFID antenna 166 functions the same as the HF RFID antenna 130 except that is provides a low frequency range of detection. The RFID reader 124 uses the LF RFID antenna 166 to generate low frequency RF energy that complements the high frequency RF energy generated by the HF RFID antenna 130. For example, the RFID reader 124 can use the LF RFID antenna 166 to generate RF energy ranging from about 30 kHz to about 300 kHz. The RFID reader 124 preferably operates the LF RFID antenna 166 at a range between about 125 kHz and about 134 kHz. The RFID reader 124 can use the LF RFID antenna 166 to detect RF signals at a range between about 1 cm and about 10 cm. Compared to the to the HF RFID antenna 130, the LF RFID antenna 166 requires many more turns or more wire in order to meet its larger inductance requirement. As a result, the LF RFID antenna 166 is larger than the HF RFID antenna 130. Due to its larger size, the LF RFID antenna 166 needs to be separate from the touch pad PC board 168.

Figure 5:
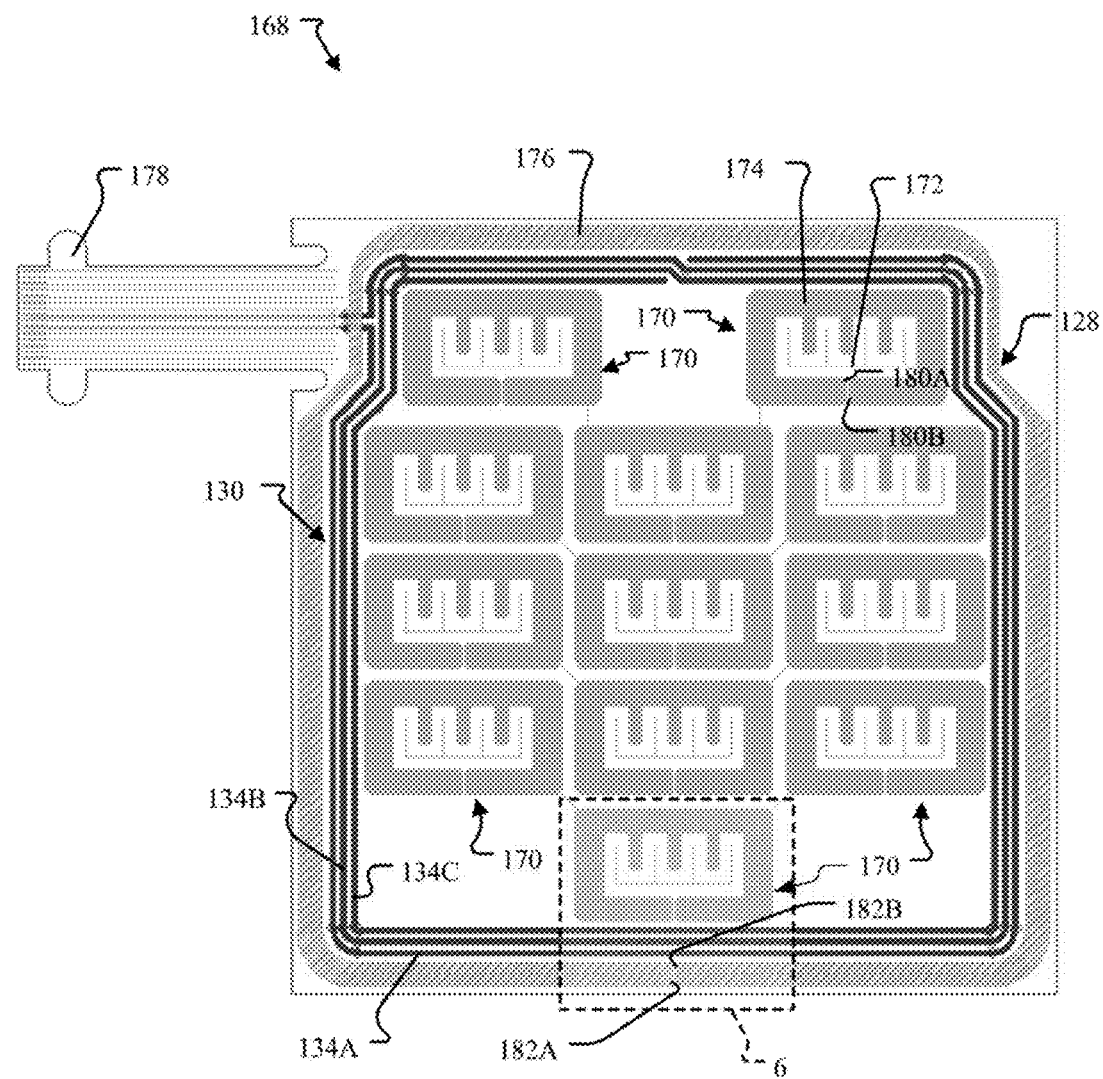
FIG. 5 is a schematic diagram of the touch pad PC board of FIG. 4.

FIG. 5 depicts the main parts of the touch pad PC board 168 of FIG. 4. The main parts include the capacitive touch pad 128 and the RFID antenna 130.

The RFID antenna 130 includes antenna current-carrying loops 134A-C in the touch pad PC board 168. The antenna current-carrying loops 134A-C can be etched into or deposited on the touch pad PC board 168. The antenna current-carrying loops 134A-C include a first antenna current-carrying loop 134A, a second antenna current-carrying loop 134B, and a third antenna current-carrying loop 134A. The number of antenna current-carrying loops (e.g., three) correlates with the number of turns in the RFID antenna 130. As appreciated by one of skill in the art, the number of antenna current-carrying loops can be as few as one or as many as several hundred (i.e., ranging from one turn to several hundred turns). As illustrated, the three antenna current-carrying loops 134A-C are preferably series-connected current-carrying loops (i.e., three antenna current-carrying loops 134A-C are in series with each other). Together, these antenna current-carrying loops 134A-C direct enough current in order to generate the RF energy needed for powering or activating RFID tags 111 of contactless keycards 110. The antenna current-carrying loops 134A-C define the physical aperture of the RFID antenna 130.

The capacitive touch pad 128 includes capacitive touch sensors 170. The capacitive touch sensors 170 are positioned in the physical aperture with the RFID antenna 130 extending around the capacitive touch sensors 170. The device controller 122 monitors the capacitive touch sensors 170 to detect changes in capacitance as an indication of the user 108 touching one or more of the capacitive touch sensors 170. The capacitive touch sensors 170 are preferably constructed from a conductive metal layers.

Each capacitive touch sensor 170 includes two capacitive touch sensor elements (an inner capacitive touch sensor element 172 and an outer capacitive touch sensor element 174). The capacitive touch sensor 170 uses a mutual capacitance sensing technique since it has two capacitive sensing elements (i.e., two capacitive touch sensor elements 172, 174). For example, the device controller 122 measures the change of capacitance between the outer capacitive touch sensor element 174 and the inner capacitive touch sensor element 172. If the device controller 122 measures a relatively large change of capacitance, it is indicative of touch by a finger of the user 108. The outer capacitive touch sensor element 174 has a thicker profile and a larger area compared to the inner capacitive touch sensor element 172.

The outer capacitive touch sensor element 174 is in the form of an interrupted loop. This interrupted loop prevents current from flowing in the outer capacitive touch sensor element 174 (i.e., prevents current coupling). As a result, this interrupted loop limits the formation of eddy currents in the capacitive touch sensor 170.

The capacitive touch pad 128 also includes a capacitive touch guard ring 176. The capacitive touch guard ring 176 extends around the RFID antenna 130. Specifically, the capacitive touch guard ring 176 extends around the periphery of the physical aperture of the RFID antenna 130.

The device controller 122 uses the capacitive touch guard ring 176 (also called a proximity sensing loop) to provide proximity sense detection. For example, the device controller 122 can use the capacitive touch guard ring 176 to detect an approaching hand or finger of the user 108 and also detect false presses such as by rain or other water. The device controller 122 monitors the capacitive touch guard ring 176 for changes in capacitance as an indication of the user 108 coming into proximity of the capacitive touch guard ring 176. In one example, this indication of the user 108 can result in the activation of a light (e.g., light in display 126 is activated). The capacitive touch guard ring 176 is required to be constructed from a metal layer. The capacitive touch guard ring 176 uses a self-capacitance technique since it has only one sense element.

The capacitive touch guard ring 176 is preferably in the form of an interrupted loop. This interrupted loop prevents current from flowing in the capacitive touch guard ring 176. As a result, this interrupted loop limits the formation of eddy currents in the capacitive touch guard ring 176, The touch pad PC board 168 includes a terminal connection 178 for connecting the touch pad PC board 168 to other circuit boards. For example, the touch pad PC board 168 is connected the main PC board 162 and the MCP board 160 via the terminal connection 178. The device controller 122 can monitor the capacitive touch pad 128 via the terminal connection 178. Also, the RFID reader 124 can provide current to the RFID antenna 130 via the terminal connection 178 in order to generate the RF energy. The terminal connection 178 is preferably a ribbon cable (also known as a multi-wire planar cable).

Figure 6:
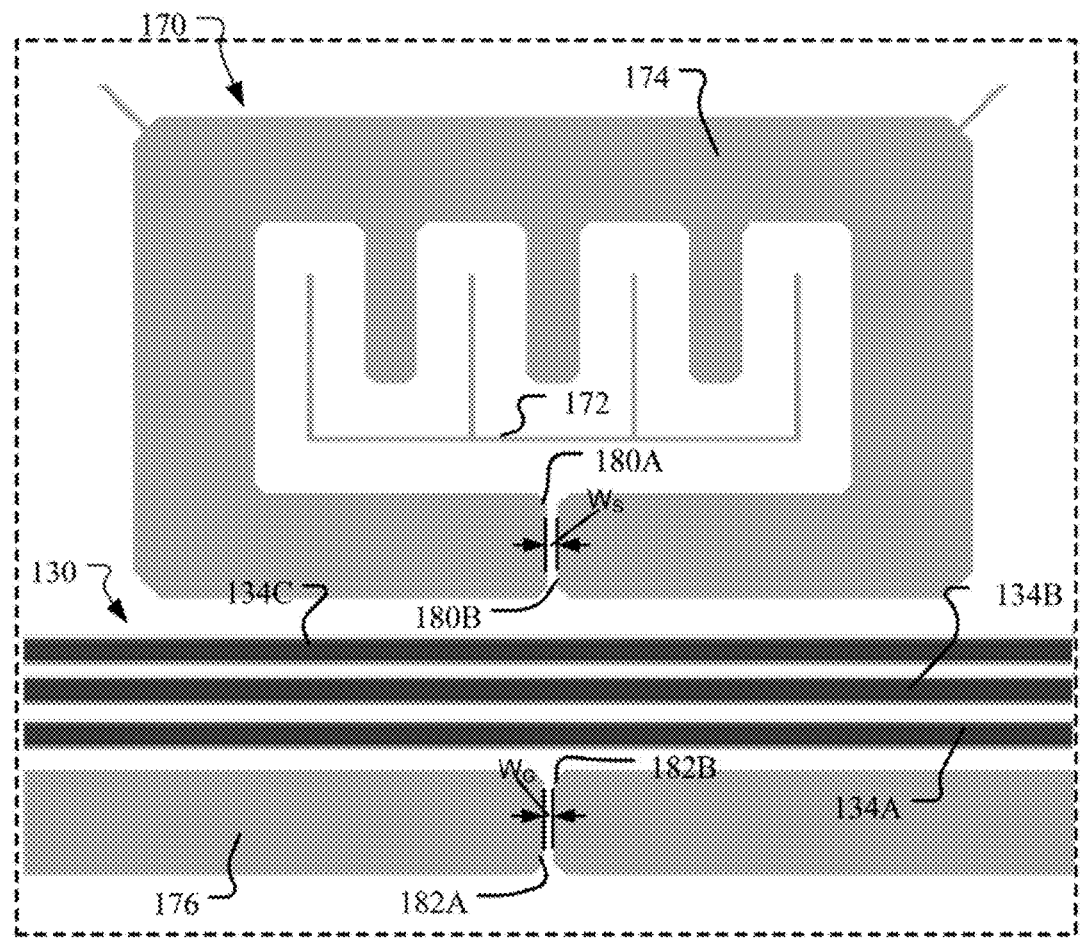
FIG. 6 is an enlarged view of a region contained in the touch pad PC board of FIG. 5.

FIG. 6 is an enlarged view of a region contained in square 6 of FIG. 5. In particular, square 6 is an enlarged view of the region along the lower edge of the touch pad PC board 168. This region includes the capacitive touch sensor 170 at the bottom of the touch pad PC board 168, the three bottom turns of the antenna current-carrying loops 134A-C, and the bottom portion of the capacitive touch guard ring 176.

The enlarged view shows details of the interrupted portion of the outer capacitive touch sensor elements 174. As illustrated, the interrupted portion is in the form of a gap that is positioned about half way along the bottom edge of the outer capacitive touch sensor element 174. The interrupted portion of the outer capacitive touch sensor element 174 is a sensor current blocking gap formed by a first sensor termination 180A and a second sensor termination 180B. The sensor current blocking gap prevents eddy currents while retaining the ability for the device controller 122 to sense voltage/current within the outer capacitive touch sensor element 174.

The enlarged view also shows details of the interrupted portion of the capacitive touch guard ring 176. The interrupted portion is positioned about half way along the bottom edge of the loop forming the capacitive touch guard ring 176. The interrupted portion of the capacitive touch guard ring 176 is a guard current blocking gap formed by a first guard termination 182A and a second guard termination 182B. The guard current blocking gap prevents eddy current flow while retaining the ability for the device controller 122 to sense voltage/current within the capacitive touch guard ring 176.

In one example, the guard current block gap is positioned approximately half way along the capacitive touch guard ring 176 in order prevent longer lengths of the capacitive touch guard ring 176 creating a large voltage difference between the two sides of the capacitive touch guard ring 176. As illustrated, the guard current block gap is preferably positioned approximately $3/8^{ths}$ along the shortest side of the capacitive touch guard ring 176. This ensures that the voltages sensed by the device controller 122 at the voltage measuring point are of similar magnitude.

It is preferred that the discontinuity in the capacitive touch guard ring 176 and each outer capacitive touch sensor element 174 be kept small (relative to the electro-static fringing) so that the electric field can cover remaining non-conductive areas. This allows for the device controller 122 to provide capacitive sensing of the entire capacitive touch sensor 170 and the entire capacitive touch guard ring 176 without generating false readings in unintended areas or areas of non-coverage. In particular, this means making the guard current blocking gap and the sensor current blocking gap small enough so that electrostatic field fringing can cover the remaining non-conductive area with parallel field lines. This facilitates capacitive sensing of the entire capacitive touch sensor 170 with a consistent response to user touch. This facilitates capacitive sensing of the entire capacitive touch guard ring 176 with a consistent response to proximity sensing.

The sensor current blocking gap has a width $W_S$ and the guard current blocking gap has a width WG that are selected to be as small as possible to prevent conductive bridges and limit formation of electric fields. The gap widths $W_S$, WG are preferably identical. In one example, the gap width $W_S$, $W_G$ is selected as about 0.125 mm (~0.005 in). More preferably, the width $W_S$, $W_G$ is selected as about 0.2 mm (~0.008 in) with 45° chamfered corners. The corners being chamfered helps in limiting the formation of the electric fields. Other widths $W_S$, $W_G$ may be selected as appreciated by one of skill in the art based on manufacturing standards while keeping the widths $W_S$, $W_G$ as small as possible to prevent conductive bridges and limit formation of electric fields.

In the illustrated examples, the touch pad PC board 168 is used in the access control reader device 120. As appreciated by one of skill in the art, the touch pad PC board 168 can be used in other devices where it is relevant and/or beneficial to use the HF RFID antenna 130 and/or the LF RFID antenna 166 in close proximity to the capacitive touch pad 128.

While this invention has been particularly shown and described with references to preferred embodiments thereof, it will be understood by those skilled in the art that various changes in form and details may be made therein without departing from the scope of the invention encompassed by the appended claims.

What is claimed is:

1. A touch pad circuit board, comprising:
a radio frequency (RF) antenna having a physical aperture; and
a capacitive touch pad positioned within the physical aperture of the RF antenna, and including multiple interrupted loops of multiple capacitive touch sensors positioned within the physical aperture with the RF antenna, which extend around the capacitive touch sensors;
wherein the capacitive touch pad comprises a capacitive touch guard ring for providing proximity sense detection, and wherein the capacitive touch guard ring extends around a periphery of the physical aperture.

2. The touch pad circuit board of claim 1, wherein the multiple capacitive touch sensors each comprise an inner capacitive touch sensor element and an outer capacitive touch sensor element, and wherein the outer capacitive touch sensor element is in the form of an interrupted loop.

3. The touch pad circuit board of claim 1, wherein the capacitive touch guard ring is in the form of an interrupted loop.

4. The touch pad circuit board of claim 1, wherein the RF antenna comprises one or more series-connected current-carrying loops.

5. An access control reader device, comprising:
a capacitive touch pad for receiving input from users, and including multiple interrupted loops of multiple capacitive touch sensors;
a radio frequency identification (RFID) reader for reading RFID tags of the users; and
a RFID antenna of the reader, the RFID antenna detecting RFID tags in proximity to the capacitive touch pad, the RFID antenna extending around the multiple capacitive touch sensors with the multiple capacitive touch sensors being positioned in a physical aperture with the RFID antenna;
wherein the capacitive touch pad comprises a capacitive touch guard ring for providing proximity sense detection, and wherein the capacitive touch guard ring extends around a periphery of the physical aperture.

6. The access control reader device of claim 5, wherein the RFID antenna detects RFID tags in a volumetric region in front of the capacitive touch pad.

7. The access control reader device of claim 5, wherein the capacitive touch pad is positioned within the physical aperture of the RFID antenna when viewed along an axis that is normal to a plane of the capacitive touch pad.

8. The access control reader device of claim 5, wherein the capacitive touch pad includes the multiple capacitive touch sensors each comprising an inner capacitive touch sensor element and an outer capacitive touch sensor element, and wherein the outer capacitive touch sensor element is in the form of an interrupted loop.

9. The access control reader device of claim 5, wherein the capacitive touch guard ring is in the form of an interrupted loop.

10. The access control reader device of claim 5, wherein the RFID antenna comprises one or more series-connected current-carrying loops.

11. The access control reader device of claim 5, further comprising another RFID antenna for detecting RFID tags in proximity to the capacitive touch pad.

12. A method of operation of an access control reader device, comprising:
receiving input from users with a capacitive touch pad, which includes multiple interrupted loops;
detecting radio frequency identification (RFID) tags of the users in a volumetric region above the capacitive touch pad with an RFID antenna; and
providing proximity sense detection with a capacitive touch guard ring that extends around a periphery of a physical aperture of the RFID antenna.

13. The method of claim 12, further comprising:
an RFID reader reading identification information from the RFID tags of the users;
an access controller authenticating the identification information; and
a door lock controller unlocking a door after the access controller authenticates the identification information.

14. A method of operation of an access control reader device, comprising:
receiving input from users with a touch pad;
reading RFID tags of the users in a volumetric region in front of the touch pad with an RFID antenna;
preventing formation of eddy currents within sensors of the touch pad, the sensors including multiple interrupted loops; and
providing proximity sense detection with a capacitive touch guard ring that extends around a periphery of a physical aperture of the RFID antenna.

15. The method of claim 14, wherein preventing the formation of eddy current comprising providing gaps in the sensors.

16. The method of claim 14, further comprising arranging an RFID antenna around the touch pad.

* * * * *